United States Patent
Diggle et al.

(10) Patent No.: US 11,182,698 B2
(45) Date of Patent: Nov. 23, 2021

(54) TRAINING BEHAVIOR OF AN AGENT

(71) Applicant: Microsoft Technology Licensing, LLC, Redmond, WA (US)

(72) Inventors: Anthony David Joseph Diggle, Bagworth (GB); Jay Nanavati, Cambridge (GB); Katja Hofmann, Cambridge (GB); Sam Michael Devlin, Trumpington (GB); Andrew Philip Slowey, March (GB); Janhavi Agrawal, Cambridge (GB); David Michael Bignell, Cambridge (GB); Adrian Kieron O'Grady, St. Neots (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 204 days.

(21) Appl. No.: 16/508,287

(22) Filed: Jul. 10, 2019

(65) Prior Publication Data

US 2020/0356897 A1 Nov. 12, 2020

(30) Foreign Application Priority Data

May 9, 2019 (GB) ..................... 1906551

(51) Int. Cl.
*G06N 20/00* (2019.01)
*G06F 3/0481* (2013.01)
(Continued)

(52) U.S. Cl.
CPC ........... *G06N 20/00* (2019.01); *G06F 3/0481* (2013.01); *G06F 3/0484* (2013.01); *G06N 3/006* (2013.01)

(58) Field of Classification Search
CPC ........ G06N 20/00; G06N 3/006; G06N 3/008; G06N 5/003; G06F 3/0481; G06F 3/0484; G06F 3/011
See application file for complete search history.

(56) References Cited

U.S. PATENT DOCUMENTS

2010/0331064 A1 12/2010 Michelstein et al.
2016/0048771 A1* 2/2016 Chen ..................... G06N 20/00
706/12

(Continued)

FOREIGN PATENT DOCUMENTS

GN 107516134 A 12/2017
WO 2018123606 A1 7/2018

OTHER PUBLICATIONS

CraftAssist Instruction Passing for a Minecraft Assistant (Year: 2019).*

(Continued)

*Primary Examiner* — Pei Yong Weng

(57) ABSTRACT

An apparatus is described for training a behavior of an agent in a physical or digital environment. The apparatus comprises a memory storing the location of at least one reward token in the environment. The location has been specified by a user. At least one processor executes the agent in the environment according to a behavior policy. The processor is configured to observe values of variables comprising: an observation of the agent, an action of the agent and any reward resulting from the reward token. The processor is configured to update the behavior policy using reinforcement learning according to the observed values.

20 Claims, 9 Drawing Sheets

(51) Int. Cl.
*G06F 3/0484* (2013.01)
*G06N 3/00* (2006.01)

(56) References Cited

U.S. PATENT DOCUMENTS

2017/0304707 A1    10/2017  Morton et al.
2018/0172983 A1*    6/2018  Maeda .............. G02B 27/0012
2019/0244133 A1*    8/2019  Nakada ................. G09G 5/003

OTHER PUBLICATIONS

"International Search Report and Written Opinion Issued in PCT Application No. PCT/US20/023044", dated Aug. 28, 2020, 14 Pages.

Anton, Shaleynikov, "Integrating Machine Learning into Game Development", Retrieved From: https://dzone.com/articles/integrating-machine-learning-into-game-development, Jun. 11, 2018, 6 Pages.

Grigonis, Hillary, "With the Pika app, kids teach an A.I. program how to recognize colors", Retrieved From: https://www.digitaltrends.com/mobile/pika-kids-teach-ai-colors/, Nov. 6, 2017, 10 Pages.

Lane, Dale, "Machine Learning for Kids", Retrieved From: https://machinelearningforkids.co.uk/#!/about, Retrieved Date: Mar. 29, 2019, 3 Pages.

Nunzio, et al., "Gamification for Machine Learning: The Classification Game", Published in Journal of Medicine, vol. 9, Issue 2, Jul. 21, 2016, 8 Pages.

* cited by examiner

TRAINING BEHAVIOR OF AN AGENT

CROSS-REFERENCE TO RELATED APPLICATION

This non-provisional US patent application claims priority to UK patent application number 1906551.5 entitled "TRAINING BEHAVIOR OF AN AGENT" and filed on May 9, 2019, which is incorporated herein in its entirety by reference.

BACKGROUND

Agents are physical or digital entities which behave in their environment according to a behavior policy. A non-exhaustive list of examples of agents is: a robotic vacuum cleaner, a robot arm in a robotic assembly line of a manufacturing plant, an avatar in a video game, a digital assistant (chat bot).

Often the behavior policy is defined by a human operator such as a manufacturer or provider of the agent. The behavior policy is typically implemented by using software created by an expert programmer. However, it can be difficult to implement the behavior policy in this way and thus it is hard to deploy the agent and obtain good working results.

The embodiments described below are not limited to implementations which solve any or all of the disadvantages of known ways of training the behavior of an agent.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

An apparatus is described for training a behavior of an agent in a physical or digital environment. The apparatus comprises a memory storing the location of at least one reward token in the environment. The location has been specified by a user. At least one processor executes the agent in the environment according to a behavior policy. The processor is configured to observe values of variables comprising: an observation of the agent, an action of the agent and any reward resulting from the reward token. The processor is configured to update the behavior policy using reinforcement learning according to the observed values.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
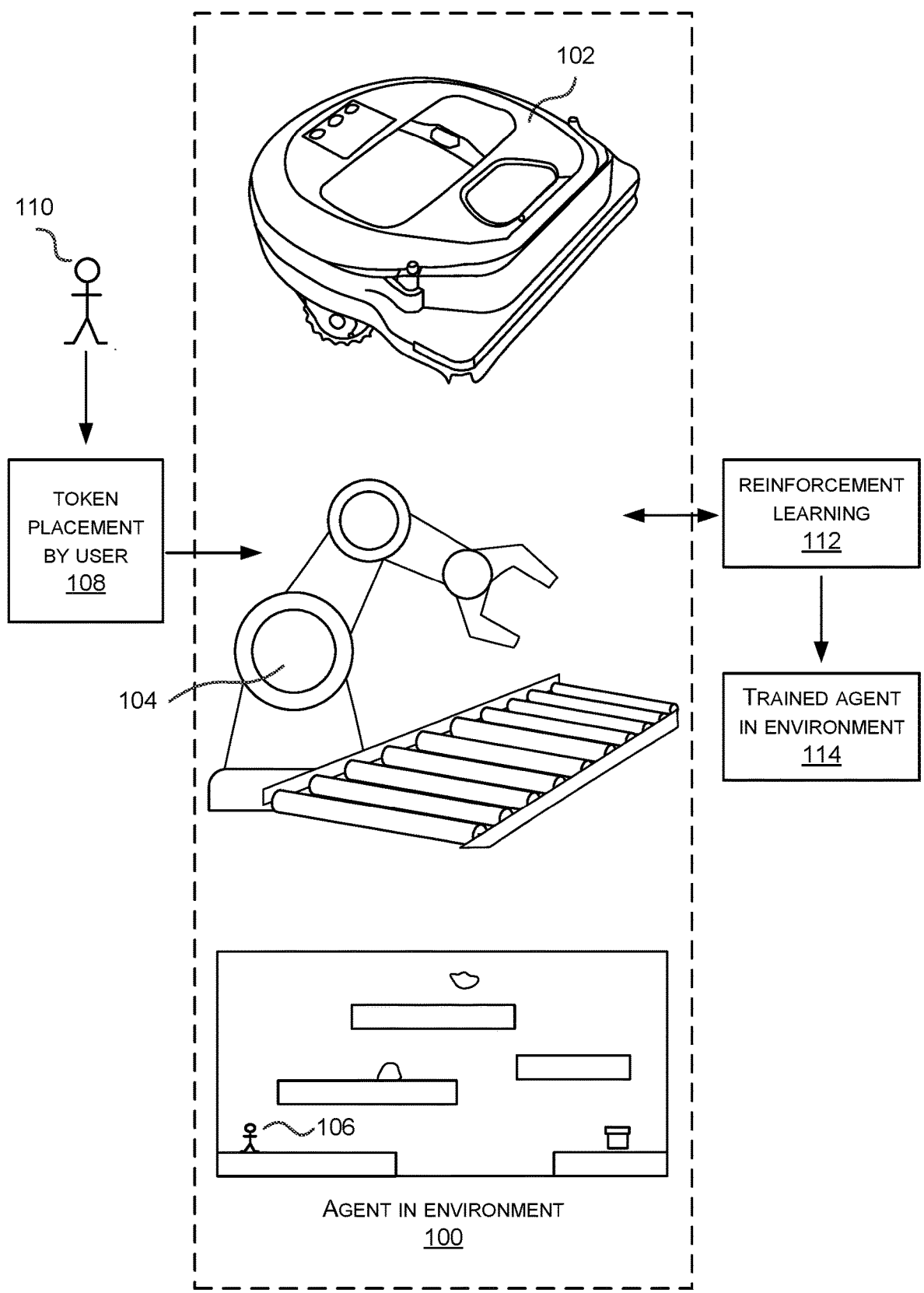
FIG. 1 is a schematic diagram of agents in environments.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

As mentioned above, agents have a behavior policy which is typically defined by a human operator such as a manufacturer or provider of the agent. The behavior policy is software for example, comprising hand crafted rules which specify how the agent is to behave in its environment. To create software encoding hand crafted rules for controlling an agent is a time consuming and complex task which is done by skilled programmers.

A behavior policy for an agent may be implemented by a manufacturer and installed into an agent during manufacture. In this case, the behavior policy has to be created for a generic environment since it is not known at the time of manufacture, which particular environment the agent is going to be deployed in. In the case where the agent is a robot vacuum cleaner the behavior policy is created for a generic domestic room. However, when the robot vacuum cleaner is deployed in a particular domestic room, such as the sitting room of the reader's home, then the behavior policy is most likely sub-optimal. As a result the robot vacuum cleaner bumps into furniture and may cause damage to soft furnishings or other items in the home. In order to make the behavior policy bespoke to the particular home concerned, the robot vacuum cleaner has to be trained when it is deployed, that is, after manufacturing. However, it is difficult for lay people to train agents.

The present technology uses reinforcement learning in order to enable agents to be trained to behave in particular environments according to a behavior policy. A behavior policy is a definition of how an agent behaves in an environment and it is defined as a function which takes as arguments values of observation variables and which computes values of action variables. The observation is the part of the environment that the agent has information about at a current time. The present technology uses any well-known reinforcement learning algorithm to update the behavior policy according to tuples of values, where the tuples of values are values of the observation variables for the current time, values of action variables for actions taken by the agent at the current time, and values of any reward tokens which are applicable. Note that the observation omits the reward token(s) since the agent is unable to directly observe the reward tokens but only to learn from the effect of the reward tokens. A reward token is a visual element which is virtual and which can be positioned by a user in the environment. A reward token is either a positive or a negative reward token. The behavior of the agent is trained even though the agent does not "see" the reward tokens in its observation. The agent learns to associate the reward with the observation and the action taken but not the reward token as the reward token is only visible/observable to the end user and not the agent.

By using reinforcement learning it is possible to train a behavior of an agent in an environment in an efficient and effective manner. However, typically a machine learning expert is needed in order to use reinforcement learning to train a particular behavior for an agent. Typically it is very difficult to construct a good reward function for use in reinforcement learning without knowing what is going on "under the hood". In contrast, the present technology enables end users to simply place one or more reward tokens in the environment of the agent in order to train it. The end user does not need to know details of how the reinforcement learning works.

FIG. 1 is a schematic diagram of an agent 100 in an environment. In this example the agent is a robot vacuum cleaner 102 in a domestic home, or a robot arm 104 in a manufacturing plant, or an avatar 106 in a video game. An end user 110 places 108 one or more reward tokens in the environment of the agent 100. The agent is then trained using reinforcement learning 112 in its environment and this produces a trained agent 114 trained to behave in the particular environment. By placing the reward tokens in the environment the user is able to influence outcome of the training and so the resulting trained agent 114 behaves how the user desires. This is achieved without the user 110 having to understand reinforcement learning 112 or to write any software.

Alternatively, or in addition, the functionality of the agent is performed, at least in part, by one or more hardware logic components. For example, and without limitation, illustrative types of hardware logic components are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

In some examples, the functionality of the agent is performed, at least in part, by computing facilities in the cloud.

Figure 2:
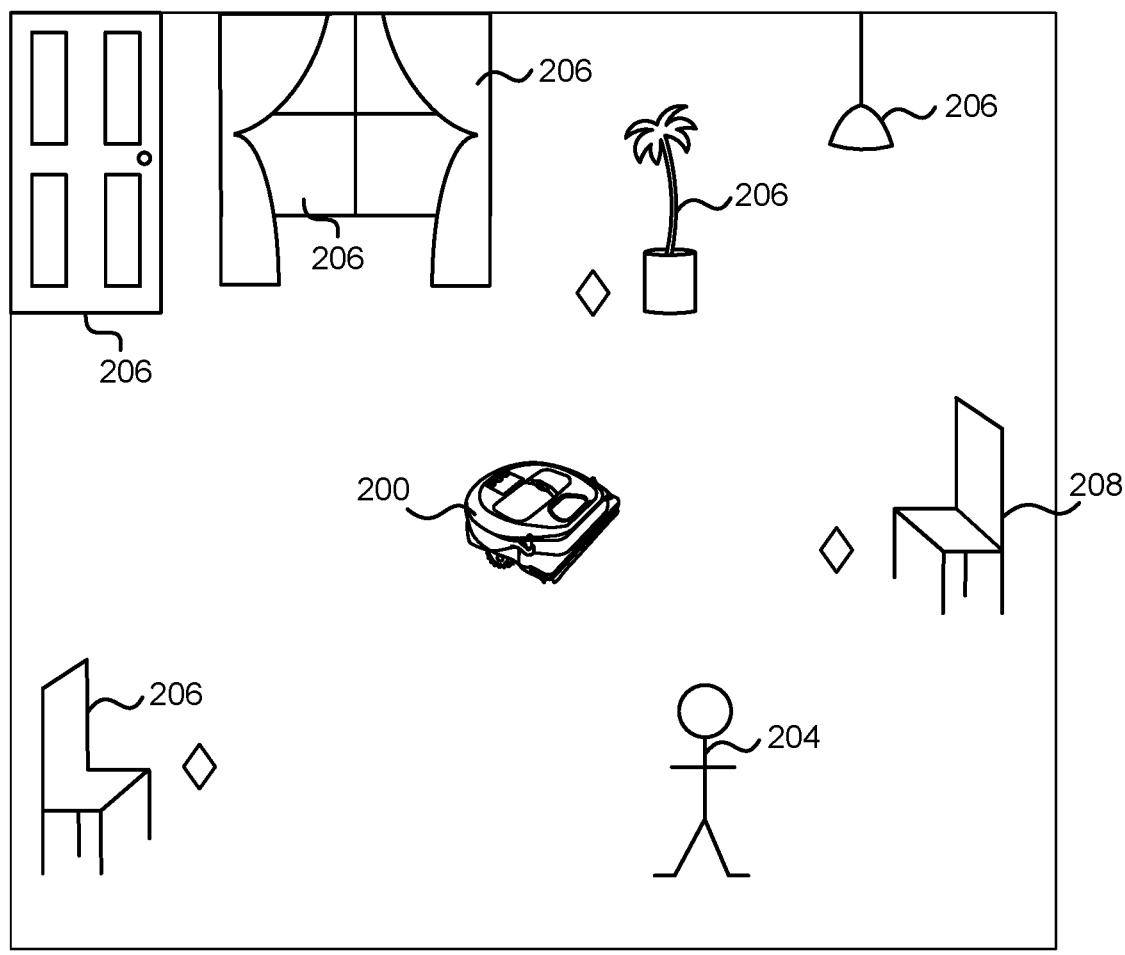
FIG. 2 is a schematic diagram of a robot vacuum cleaner in a living room and showing user positioned reward tokens in the living room.

In the example of FIG. 2 the agent is a robot vacuum cleaner 200 in a domestic living room where there are various objects 206 as well as a chair 208. A person 204 in the room is the users who has placed three reward tokens in the room. The reward tokens are virtual tokens placed at locations in the room by the user operating an augmented-reality computing device (not shown). The user has put the reward tokens so they are spaced from an item of furniture by a distance which is approximately half the width of the robot vacuum cleaner 200. In this way the robot vacuum cleaner is trained to avoid bumping into the furniture but at the same time to clean as close as possible to the furniture (since it receives a reward when it moves into a position with a token).

Figure 3:
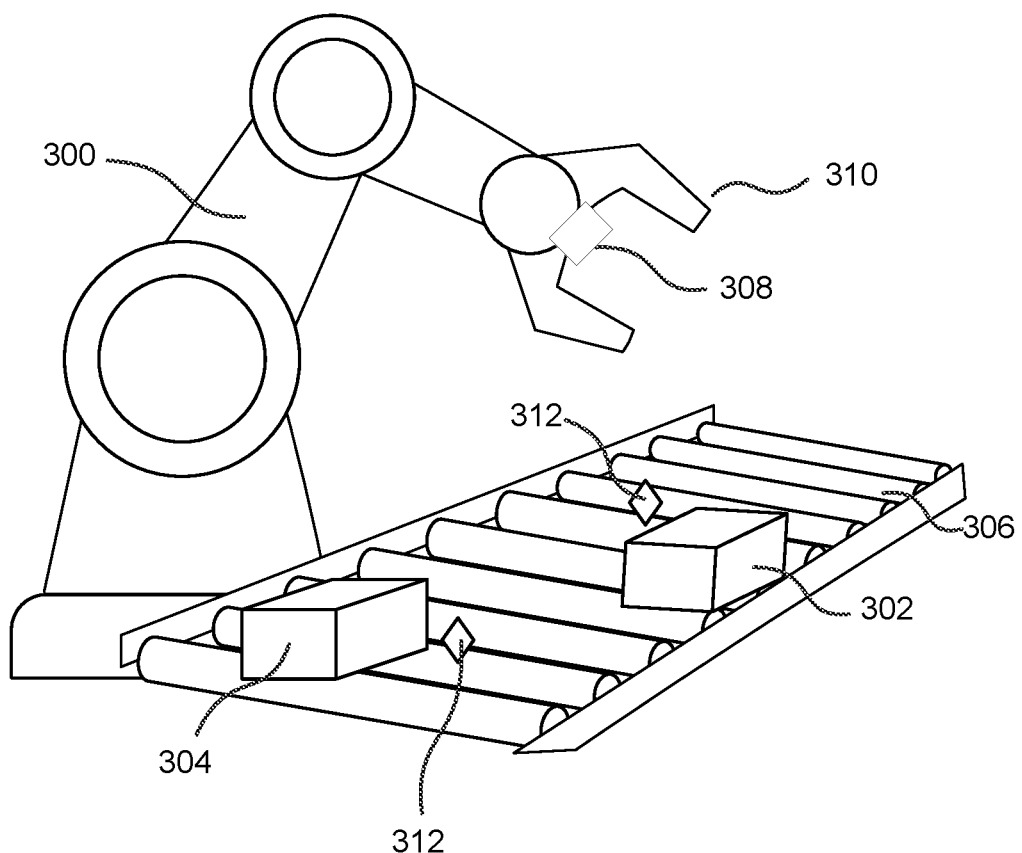
FIG. 3 is a schematic diagram of a robot arm in a manufacturing plant and showing user positioned reward tokens.

In the example of FIG. 3 the agent is a robot arm 300 in a manufacturing plant. A conveyor belt 306 conveys boxes 302, 304 to be picked up by the robot arm 300 using pincers 310. The boxes 302, 304 are in a variety of different positions on the conveyor belt and the robot arm has to detect the boxes using camera 308 in order to pick them up. The robot arm has to be trained to pick up the boxes 302, 304 without damaging the boxes 302, 304. To facilitate the training, reward tokens 312 are located in the environment by a user. The reward tokens are positioned spaced from the boxes by an amount similar to a width of a pincer of the robot arm. In this way the robot arm learns to pick up the boxes without damaging them since it receives a reward when the pincers are appropriately spaced from the box.

Figure 4A:
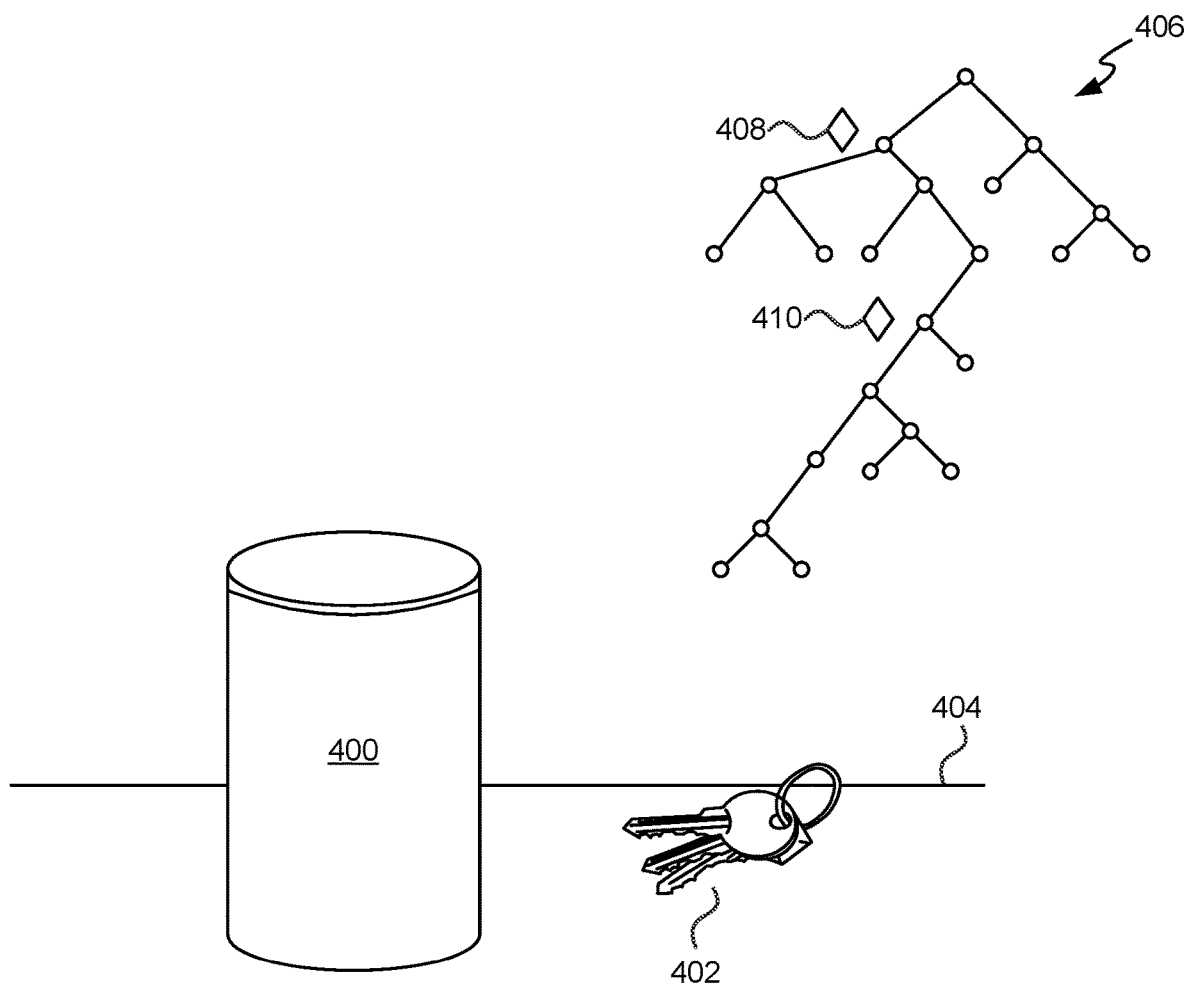
FIG. 4A is a schematic diagram of a chat bot and a decision tree.
Figure 4B:
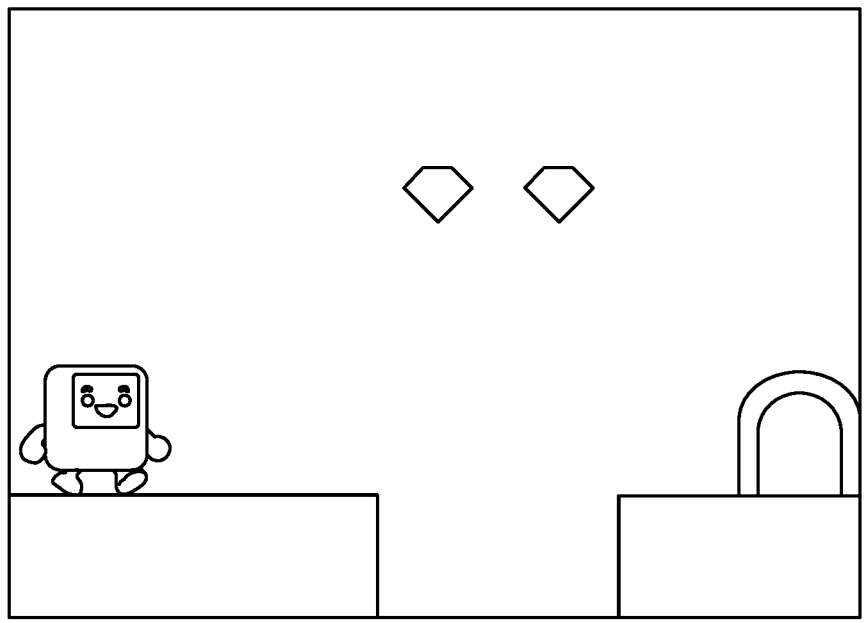
FIG. 4B is a schematic diagram of an avatar in a platformer game with user positioned reward tokens.
Figure 4B:
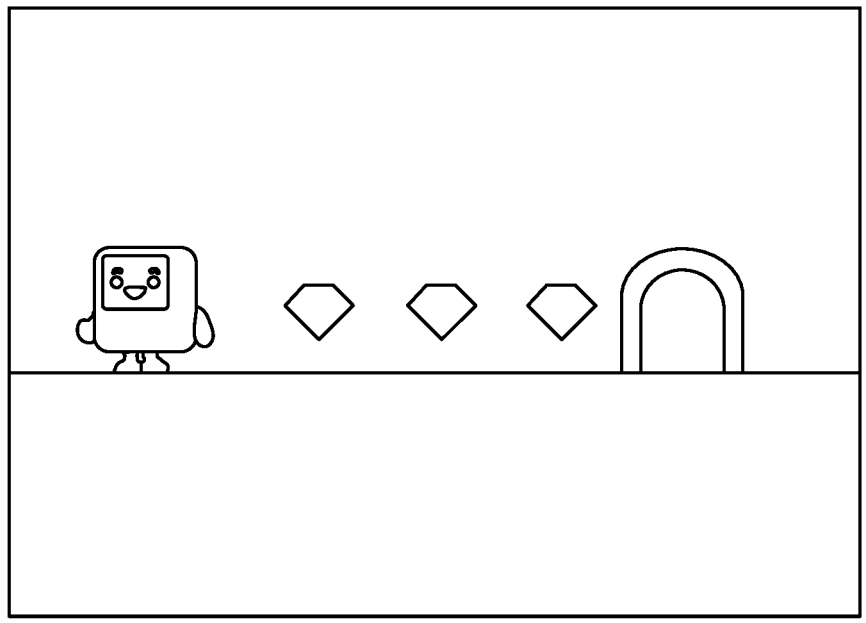

In the example of FIG. 4 the agent is a chat bot 400 on a table 404 of an office. On the table 404 is a set of keys 402 to illustrate the relative size of the chat bot 400. The chat bot has a plurality of skills as is well known and has to decide which skill to activate in a particular situation. A non-exhaustive list of example skills is: turn on the lights, turn off the oven, book a restaurant, make a calendar entry.

A decision tree 406 is shown in FIG. 4 and is a schematic representation of a decision tree within software implementing the chat bot 400 in the cloud. Leaves of the decision tree denote skills of the chat bot and internal split nodes of the tree denote decision points. The software of the chat bot searches the decision tree according to the current situation of the chat bot to find a leaf node which denotes which skill to execute in that situation. In this example, the environment of the agent is represented by the decision tree and a user places one or more tokens 408, 410 in the decision tree using a graphical user interface. In this case the reward tokens are graphical elements. The reward tokens enable the agent to be trained to use particular skills in particular situations. In this way the user is able to train the chat bot without having detailed knowledge about reinforcement learning.

In the example of FIG. 4B the agent is an avatar in a 2D platformer game (in this example, a television character). The user has placed diamonds in the environment which in this case is the 2D platformer game. The goal of the avatar is to reach the black doorway shown in FIG. 4B by moving through the environment. The user has positioned the blue diamonds to facilitate the avatar learning to jump over the gap (upper part of FIG. 4B) and to move in a direction towards the black doorway (lower part of FIG. 4B).

Figure 5:
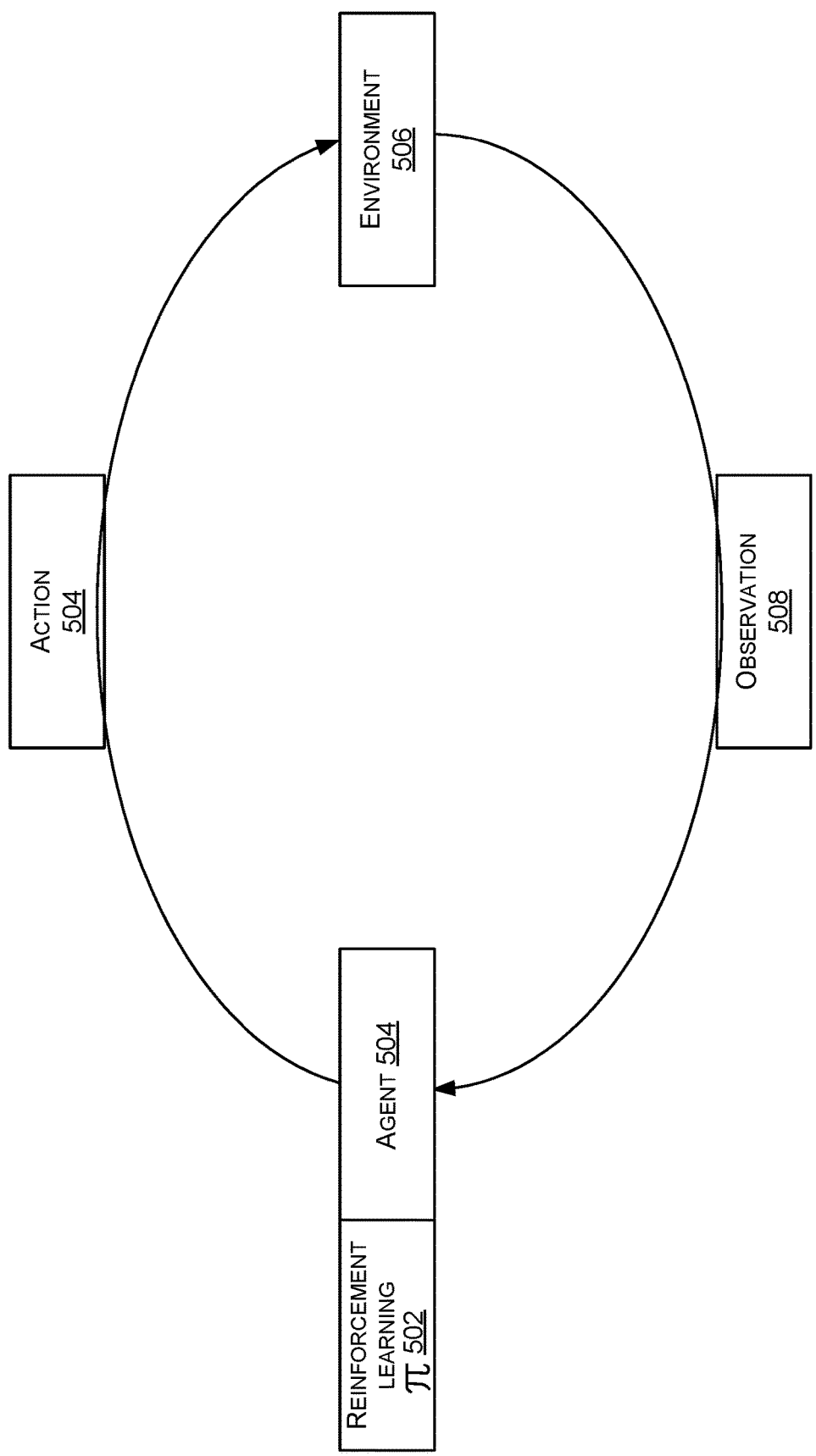
FIG. 5 is a schematic diagram of a reinforcement learning cycle.

FIG. 5 is a schematic diagram of a reinforcement learning cycle. FIG. 5 shows an agent 500 having a reinforcement learning component 502. The agent 500 has a behavior policy denoted using the symbol 7E in FIG. 5 for clarity. The agent is the robot vacuum cleaner 102, or the robot arm 104, or the avatar 106 or the chat bot 400 or any other agent.

When the agent 500 executes in its environment 506 it carries out an action 504. When the agent 500 is first deployed in the environment 506 the behavior policy is initialized to random, or to manually configured settings. What action 504 to execute is computed from the initialized behavior policy by the agent 500 according to its current observation of the environment 506. The action 504 occurs in the environment 506 and may change the environment or the observation. The agent now has a set of three values comprising: the information about the action 504, the observation 508 and any reward tokens which have been encountered in the environment as a result of action 504. The agent uses the set of three values as input to the reinforcement learning component 502. The reinforcement learning component 502 updates the behavior policy using an update algorithm according to the set of three observed values. The behavior policy is updated so as to be more likely to generate actions which will generate reward in future. The cycle illustrated in FIG. 5 repeats continuously, or at least until there is little change in the behavior policy such as when values of the observed variables are within a specified range of constant.

By using information about user-positioned reward tokens as part of the process of updating the behavior policy it is possible for the agent to be trained efficiently and effectively to take into account those reward tokens. This is achieved even though the agent does not "see" the reward tokens in its observation. The agent learns to associate its action 504 with the reward from the reward token placed by the user. In this way the user is able to train behavior of the agent without needing to know about how the reinforcement learning works or to write any software.

Due to the nature of reinforcement learning, once the agent has been trained on a behavior, there are typically slight variations in how the agent does the behavior each time the agent performs the behavior. These small variations are beneficial in a number of ways. The variations lead to robustness of the agent's behavior since if there are changes in the environment over time the agent is better able to cope with those changes (without being retrained) rather than becoming stuck or failing. The variations also maintain interest for human users such as where the agent is an avatar in a video game.

Figure 6:
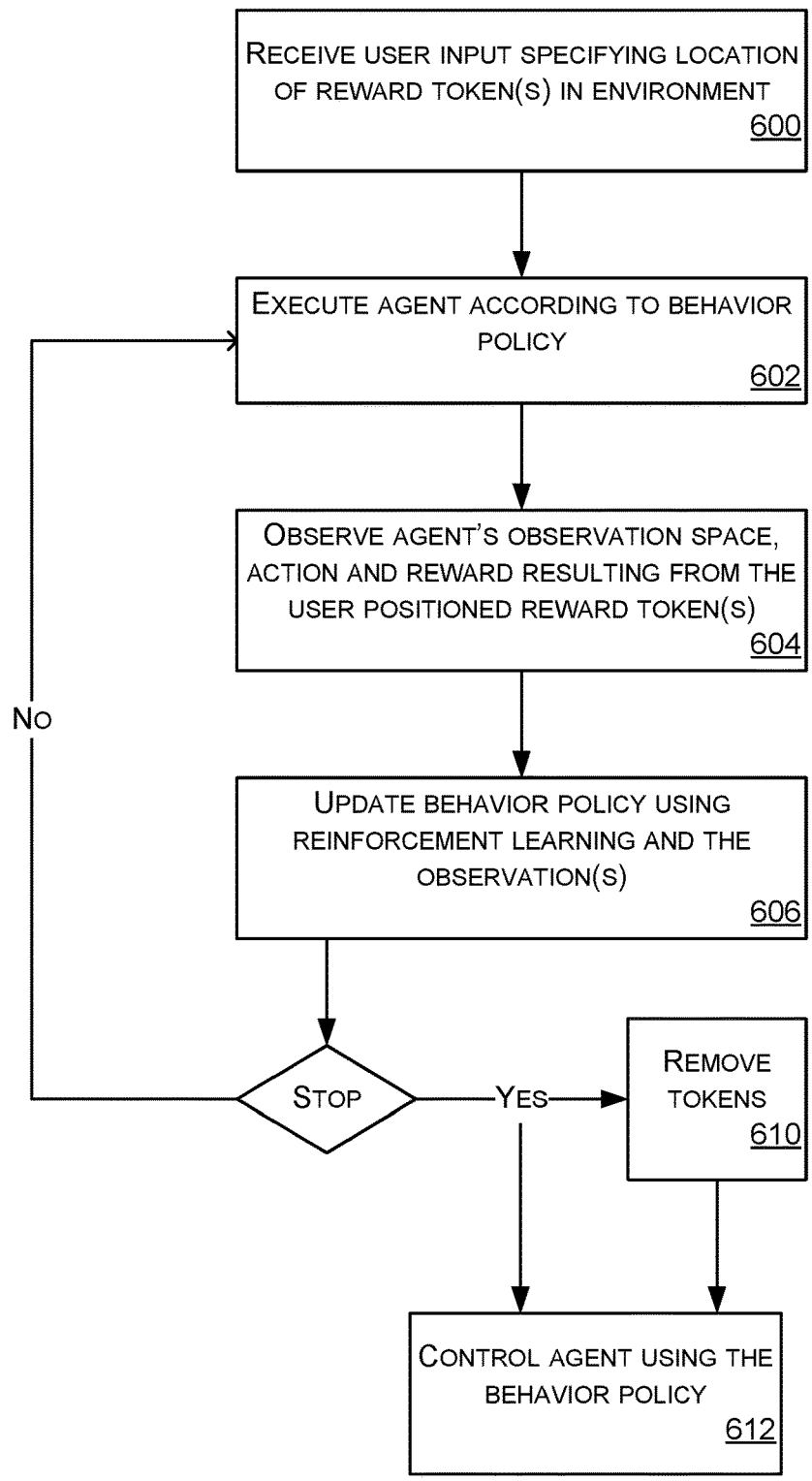
FIG. 6 is a flow diagram of a method performed by an agent for training a behavior of the agent.

FIG. 6 is a flow diagram of a method performed by an agent. The agent receives 600 user input specifying the location of one or more reward tokens in its environment. The reward tokens are virtual and specify a position in the environment of the agent. The agent 602 executes according to its behavior policy and the agent observes 604 its observation, the action it took, and any reward resulting from the user positioned reward token(s). The agent updates 606 the behavior policy using reinforcement learning and the observations. The agent decides whether to stop learning, and if so it proceeds to control itself using the behavior policy. Optionally it removes the tokens 610 from the environment.

If the agent decides to continue training, the process of FIG. 6 repeats from operation 602.

Figure 7:
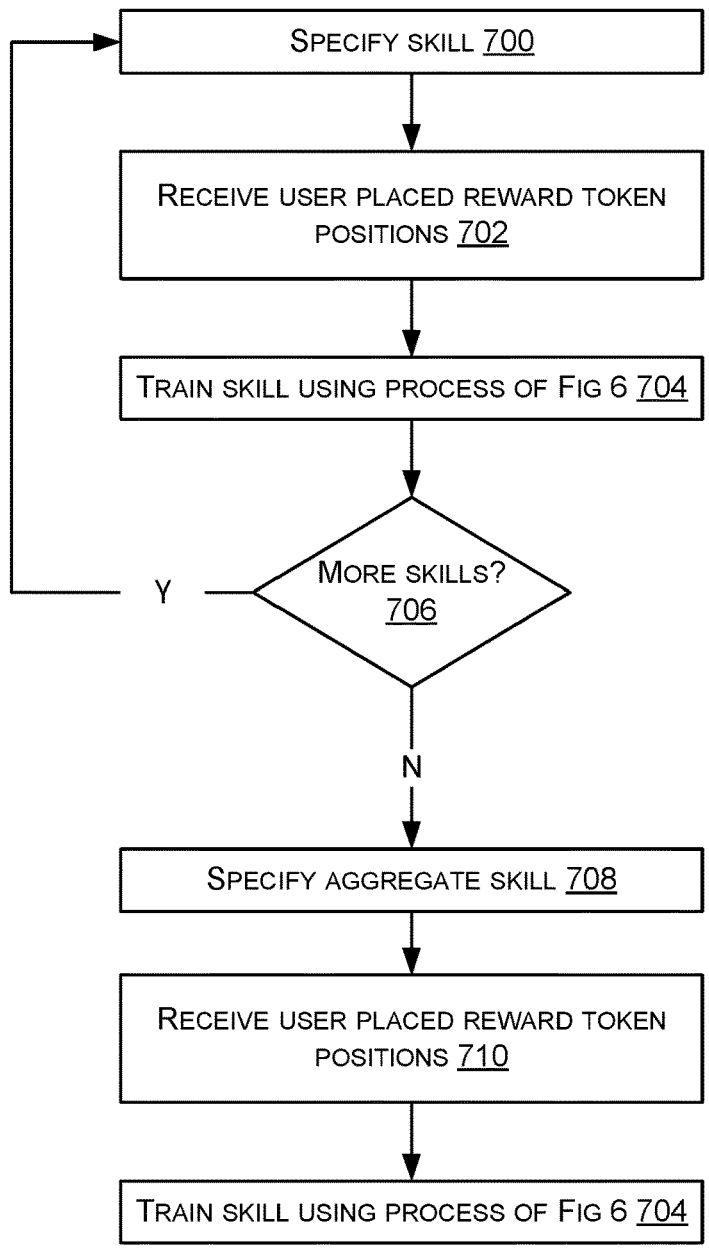
FIG. 7 is a flow diagram of a method performed by an agent for training skills of an aggregate skill.

In some cases the user wants to train the agent on a complex behavior which is an aggregate of two or more skills. FIG. 7 is an example of a method at the agent of training an aggregate skill which is a complex behavior made up of two or more skills.

The user thinks about the complex behavior and breaks it down into two or more skills. The user specifies one of the skills 700 and places one or more reward tokens into the environment in order to train the agent on the specified skill. FIG. 7 shows the method performed by the agent. For the specified skill 700 the agent receives 702 one or more positions of user placed reward tokens. It trains 704 itself to do the skill using the process of FIG. 6.

The agent then checks at decision point 706 whether more skills have been specified by the user. If so, it moves to the next specified skill and repeats operations 700, 702 and 704. If all the specified skills have been trained, then at decision point 706 the agent proceeds with operation 708. At operation 708 the agent is now going to train to do the specified aggregate skill 708. It receives 710 one or more user placed reward token positions for the aggregate skill. It trains using the process of FIG. 6 at operation 704. Once training is complete the agent is now able to do the complex behavior. In this way a lay person is able to train an agent to carry out complex behaviors without the lay person needing to know about machine learning or about how to write computer software.

The agent uses user placed reward token positions so that the agent operates in an unconventional manner to be trained on complex behaviors by lay people.

By using user placed reward token positions the functioning of the underlying computing device is improved by enabling it to be trained to do a behavior in a simple and effective manner. It is not necessary for the human to know what is going on "under the hood".

An alternative approach is to give feedback after the fact. Where feedback is given after the fact, an agent is executed in its environment and a human observes the agent's behavior. The human later gives feedback to the agent about its behavior. Using feedback after the fact does not work well. Feedback after the fact allows the agent to cause damage in some examples, such as where a robot vacuum cleaner collides with furniture. Feedback after the fact is time consuming as it requires the human to observe long trajectories of behavior by the agent, such as watching hours of a robot vacuum cleaner cleaning, in order to then critique the situations where the behavior is wrong.

Another alternative approach is to give preference based feedback. Preference based feedback involves the agent doing a task twice and then a human gives feedback about which of the two instances was better. This approach does not work well. Preference based feedback involves a human spending significant time observing large quantities of agent actions.

Figure 8:
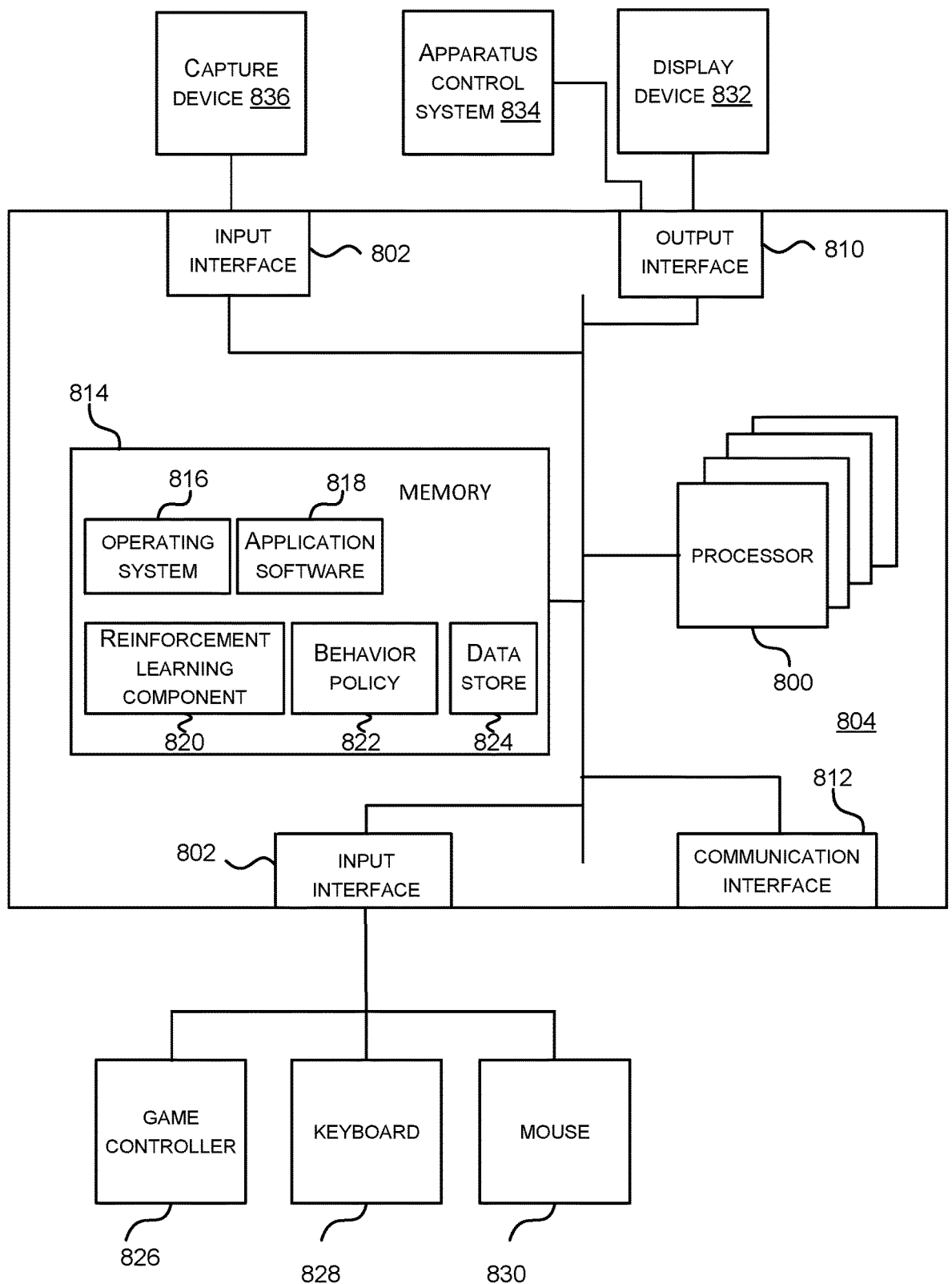
FIG. 8 illustrates an exemplary computing-based device in which embodiments of an agent are implemented.

FIG. 8 illustrates various components of an exemplary computing-based device 804 which are implemented as any form of a computing and/or electronic device, and in which embodiments of an agent are implemented in some examples.

Computing-based device 804 comprises one or more processors 800 which are microprocessors, controllers or any other suitable type of processors for processing computer executable instructions to control the operation of the device in order to execute the agent in an environment according to a behavior policy 822 and to train one or more behaviors of the agent using a reinforcement learning component 820. In some examples, for example where a system on a chip architecture is used, the processors 800 include one or more fixed function blocks (also referred to as accelerators) which implement a part of the method of executing the agent and/or training the agent in hardware (rather than software or firmware). Platform software comprising an operating system 816 or any other suitable platform software is provided at the computing-based device to enable application software 818 to be executed on the device. A data store 824 holds values of observation variables, action variables and positions of user placed reward tokens.

The computer executable instructions are provided using any computer-readable media that is accessible by computing based device 804. Computer-readable media includes, for example, computer storage media such as memory 814 and communications media. Computer storage media, such as memory 814, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 814) is shown within the computing-based device 804 it will be appreciated that the storage is, in some examples, distributed or located remotely and accessed via a network or other communication link (e.g. using communication interface 812).

The computing-based device 804 also comprises an output interface 810 arranged to output display information to a display device 832 which may be separate from or integral to the computing-based device 804. The output interface 810 also sends instructions to an apparatus control system 834 such as a robot arm where the agent is a robot arm, or a motor where the agent is a robot vacuum cleaner. The display information may provide a graphical user interface. An input interface 802 is arranged to receive and process input from one or more devices, such as a user input device (e.g. a mouse 830, keyboard 828, game controller 826, capture device 836, camera, microphone or other sensor). In some examples the user input device detects voice input, user gestures or other user actions and provides a natural user interface (NUI). This user input may be used to position reward tokens in the environment. In an embodiment the display device 832 also acts as the user input device if it is a touch sensitive display device.

Alternatively or in addition to the other examples described herein, examples include any combination of the following:

Clause A. An apparatus for training a behavior of an agent in a physical or digital environment, the apparatus comprising:
a memory storing the location of at least one reward token in the environment, the location having been specified by a user;
at least one processor configured to execute the agent in the environment according to a behavior policy;
the processor configured to observe values of variables comprising: an observation of the agent, an action of the agent and any reward resulting from the reward token; and
the processor configured to update the behavior policy using reinforcement learning according to the observed values.

Clause B The apparatus of clause A wherein the processor is configured to control the agent according to the updated behavior policy.

Clause C The apparatus of clause A or clause B wherein the reward resulting from the reward token results from the position of the reward token in relation to the environment.

Clause D The apparatus of clause A or clause B or clause C wherein the apparatus comprises a user interface configured to receive the user input specifying the location of the at least one reward token.

Clause E The apparatus of clause D wherein the environment is a digital environment represented graphically at the user interface and wherein the at least one reward token is a graphical element placed by the user in the graphical representation of the digital environment.

Clause F The apparatus of clause D wherein the user interface is an augmented reality user interface.

Clause G The apparatus of any preceding clause wherein the environment is a physical environment and wherein the at least one reward token is a virtual element placed by the user in the physical environment using an augmented reality user interface.

Clause H The apparatus of any preceding clause wherein the agent is a chat bot and wherein the environment is a tree structure representing possible actions of the chat bot and wherein the reward token is placed at a split node of the tree.

Clause I The apparatus of any preceding clause wherein the stored location is specified by the user in relation to a first skill to be learnt by the agent, and wherein the memory stores a second location being a location of a second reward token of a second skill to be learnt by the agent.

Clause J The apparatus of any preceding clause wherein the behavior comprises a plurality of skills, and wherein the apparatus comprises a memory storing, for each of the skills, the location of at least one reward token in the environment.

Clause K The apparatus of any preceding clause wherein the agent is any of: a robotic vacuum cleaner, a manufacturing robot arm, a chat bot, an avatar in a video game.

Clause L A method of training a behavior of an agent in a physical or digital environment, the method comprising:
receiving the location of at least one reward token in the environment, the location having been specified by a user;
executing the agent in the environment according to a behavior policy;
observing values of variables comprising: an observation of the agent, an action of the agent and any reward resulting from the reward token; and
updating the behavior policy using reinforcement learning according to the observed values.

Clause M The method of clause L wherein the behavior comprises a plurality of skills, and wherein the apparatus comprises a memory storing, for each of the skills, the location of at least one reward token in the environment.

Clause N The method of clause M comprising carrying out the receiving, executing, observing and updating for each of the skills and using the at least one reward token of the skill.

Clause O The method of clause N comprising, after the behavior policy has been updated for each of the skills, using the behavior policy to control the agent.

Clause P The method of any of clauses L to O which is repeated as values of the variables are observed over time.

Clause Q The method of any of clauses L to P which is repeated until values of the variables are within a specified range of constant.

Clause R The method of any of clauses L to Q wherein the environment is a physical environment and wherein the at least one reward token is a virtual element placed by the user in the physical environment using an augmented reality user interface.

Clause S The method of any of clauses L to R wherein the agent is a chat bot and wherein the environment is a tree structure representing possible actions of the chat bot and wherein the reward token is placed at a split node of the tree.

Clause T An apparatus for training a behavior of an agent in a physical or digital environment, the behavior comprising a plurality of skills, the apparatus comprising:
a memory storing, for each skill, the location of at least one reward token in the environment, the location having been specified by a user;
at least one processor configured to execute the agent in the environment according to a behavior policy;

the processor configured to observe values of variables comprising: an observation of the agent, an action of the agent and any reward resulting from the reward tokens; and the processor configured to update the behavior policy using reinforcement learning according to the observed values.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. An apparatus for training a behavior of an agent in a physical or digital environment, the apparatus comprising:
a memory storing a location of at least one reward token in the physical or digital environment, the location having been specified by an end user of the apparatus;
at least one processor configured to execute the agent in the physical or digital environment according to a behavior policy, the agent being a physical or digital entity which behaves in the physical or digital environment according to the behavior policy, the behavior policy being defined by a manufacturer or provider of the agent;
the processor configured to observe values of variables comprising: an observation of the agent, an action of the agent and any reward resulting from the reward token, the reward being observed by the processor without being input by the end user or the manufacturer or provider of the agent; and
the processor configured to update the behavior policy using reinforcement learning according to the observed values.

2. The apparatus of claim 1 wherein the processor is configured to control the agent according to the updated behavior policy.

3. The apparatus of claim 1 wherein the reward resulting from the reward token results from a position of the reward token in relation to the physical or digital environment.

4. The apparatus of claim 1 wherein the apparatus comprises a user interface configured to receive, from the end user, a user input specifying the location of the at least one reward token.

5. The apparatus of claim 4 wherein the physical or digital environment is a digital environment represented graphically at the user interface and wherein the at least one reward token is a graphical element placed by the end user in the graphical representation of the digital environment.

6. The apparatus of claim 4 wherein the user interface is an augmented reality user interface.

7. The apparatus of claim 1 wherein the physical or digital environment is a physical environment and wherein the at least one reward token is a virtual element placed by the end user in the physical environment using an augmented reality user interface.

8. The apparatus of claim 1 wherein the agent is a chat bot and wherein the physical or digital environment is a digital environment comprising a tree structure representing possible actions of the chat bot and wherein the reward token is placed at a split node of the tree structure, wherein leaves of the tree structure represent skills of the chat bot.

9. The apparatus of claim 1 wherein the stored location is specified by the end user in relation to a first skill to be learnt by the agent, and wherein the memory stores a second location being a location of a second reward token of a second skill to be learnt by the agent, the agent being trained to do an aggregate skill including the first skill and the second skill.

10. The apparatus of claim 1 wherein the behavior comprises a plurality of skills, and wherein the apparatus comprises a memory storing, for each of the skills, the location of the at least one reward token in the physical or digital environment.

11. The apparatus of claim 1 wherein the agent is any of: a robotic vacuum cleaner, a manufacturing robot arm, a chat bot, an avatar in a video game.

12. A method of training a behavior of an agent in a physical or digital environment, the method comprising:
   receiving a location of at least one reward token in the physical or digital environment, the location having been specified by an end user;
   executing the agent in the physical or digital environment according to a behavior policy, the agent being a physical or digital entity which behaves in the physical or digital environment according to the behavior policy, the behavior policy being defined by a manufacturer or provider of the agent;
   observing, by a processor, values of variables comprising: an observation of the agent, an action of the agent and any reward resulting from the reward token, the reward being observed by the processor without being input by the end user or the manufacturer or provider of the agent; and
   updating the behavior policy using reinforcement learning according to the observed values.

13. The method of claim 12 wherein the agent is an avatar in a 2D platformer game, the method further comprising observing a variation in a behavior of the avatar from the updated behavior policy, wherein the avatar is not retrained after the observed variation of the behavior.

14. The method of claim 12 wherein the behavior comprises a plurality of skills, the method comprising carrying out the receiving, executing, observing and updating for each of the skills and using the at least one reward token of the skill.

15. The method of claim 14 comprising, after the behavior policy has been updated for each of the skills, using the updated behavior policy to control the agent.

16. The method of claim 12 which is repeated as values of the variables are observed over time.

17. The method of claim 12 which is repeated until values of the variables are within a specified range of constant.

18. The method of claim 12 wherein the physical or digital environment is a physical environment and wherein the at least one reward token is a virtual element placed by the end user in the physical environment using an augmented reality user interface.

19. The method of claim 12 wherein the agent is a chat bot and wherein the physical or digital environment is a digital environment comprising a tree structure representing possible actions of the chat bot and wherein the reward token is placed at a split node of the tree structure.

20. An apparatus for training a behavior of an agent in a physical or digital environment, the behavior comprising a plurality of skills, the apparatus comprising:
   a memory storing, for each skill, a location of at least one reward token in the physical or digital environment, the location having been specified by an end user of the apparatus;
   at least one processor configured to execute the agent in the physical or digital environment according to a behavior policy, the agent being a physical or digital entity which behaves in the physical or digital environment according to the behavior policy, the behavior policy being defined by a manufacturer or provider of the agent;
   the processor configured to observe values of variables comprising: an observation of the agent, an action of the agent and any reward resulting from the reward tokens, the reward being observed by the processor without being input by the end user or the manufacturer or provider of the agent; and
   the processor configured to update the behavior policy using reinforcement learning according to the observed values.

* * * * *